No. 773,494. Patented October 25, 1904.

UNITED STATES PATENT OFFICE.

ADOLF GUTENSOHN, OF SOUTHEND, ENGLAND.

COMPOSITION OF MATTER FOR PURIFYING SEA OR HARD WATER.

SPECIFICATION forming part of Letters Patent No. 773,494, dated October 25, 1904.

Application filed January 18, 1904. Serial No. 189,602. (No specimens.)

*To all whom it may concern:*

Be it known that I, ADOLF GUTENSOHN, a subject of the King of Bavaria, and a resident of Southend, in the county of Essex, England, have invented a new and useful Composition of Matters for Purifying Sea or Hard Water; and I do hereby declare the following to be a clear and exact description of the invention, as will enable others skilled in the art to which it appertains to make and use the same.

By treating sea or hard water with this invention they are rendered fit for direct use in steam-boilers without causing incrustation or corrosion, and when water from which fresh water is to be distilled is, previous to distillation, treated by this invention the stills can be worked for a long period without becoming incrustated or corroded. These results are obtained by mixing into the water before evaporation a special compound which has two actions upon the water—first, to prevent incrustation from the lime and magnesia by attracting and collecting these salts in a coagulated mass; secondly, to prevent corrosion. The active agent for the first of these results is a specially-made resinous soap, but differing widely from the usual resinous soaps or sizes, and is made in the following manner. The resinous matter used is preferably common resin; but this is first specially treated to deal with the volatile ingredients and the acids it normally contains—namely, sylvic, pinic, and colophonic—which three acids possess different degrees of stability and volatility. It is essential for my purpose in the carrying out of my invention that I obtain the least volatile and the most stable. With this object I heat the resin and distil out the volatile ingredients and impurities and convert the resin by repeated heatings practically into colophonic acid, which is the one the most suitable for my purpose, as it has the strongest affinity for bases. I next prepare an alkaline solution by dissolving in twenty-four parts of water four parts of common soda and four parts of caustic soda. I then mix one part of silicate of soda of commercial strength with an equal weight of hot water. This mixture is then added to the alkaline solution and the whole brought to boiling-point, when I add gradually as much of the specially-prepared resin as the boiling solution will convert into an almost-transparent soapy compound which separates from the watery liquid on cooling, when it can be easily collected. This constitutes the part of the compound for the separation or removal of incrustating matters from water, but does not act upon the deleterious gases liberated in a boiler or still which cause the corrosion. For absorbing or neutralizing such gases the best material is metallic zinc or a solution of this metal in an alkali. I prefer a cold saturated solution of hydrated oxid of zinc in caustic soda in the proportion of from one to two per cent. of the zinc solution to the compound. This zinc solution has the advantage over others that it does not decompose in the water when the constituents of the lime and magnesia soap produced by adding the alkaline resinous compound to sea or hard water are coagulating and separating out of the water, and as long as such solution of zinc is present in the water it will neutralize or absorb the whole of the deleterious gases liberated, and thus prevent corrosion.

Of course when sea-water or water containing chlorin or bromin compounds is to be treated both of the solutions mentioned above will be mixed together and used, but it will be understood that when hard water which does not contain bromin or chlorin is to be treated for the removal of the incrustating matters the compound will be made without the zinc.

The compound made as above described is used in the following ways: It can be used either hot or cold, and stirred into water which is either hot or cold, in proportion about three-quarters per cent., by weight, to the weight of the water to be treated. If the compound is made hot and stirred into hot water, the incrustating matters absorbed by the compound will rise to the surface with the compound when the whole can be skimmed off, the water being then free of incrustating matters; or the compound can be stirred cold into cold water, when it will attract and precipitate the incrustating matters coagulating the same, and if the water then is strained through a coarse filter-cloth the latter will hold back the incrustating matters. Other alkalis besides soda can of course be used.

It is to be understood that the combination of alkalis, specially-prepared resin and zinc, hereinbefore described, can be varied to give a compound of less value; but the proportions and articles given are those which I have found to give the best results. For example, a composition could be made of common soda and common resin or silicate of soda and common resin. These I have tried; but they do not give the best results.

The compound when heated is quite fluid, in which condition it can be pumped direct into the boiler, when it immediately acts upon the incrustating matters in the water, causing them to rise to the top, when they can be blown out by an arrangement of "blow-off" cock at the water-level.

Having now described my invention, what I desire to claim is—

1. A composition of matter for treating impure water, consisting of resin prepared by repeated heating and cooling dissolved in a solution containing common soda, caustic soda and silicate of soda, substantially as described.

2. A composition of matter for treating impure water, consisting of resin prepared by repeated heating and cooling dissolved in an alkaline fluid, mixed with an alkaline zincate, substantially as described.

3. A composition of matter for treating impure water, consisting of resin prepared by repeated heating and cooling dissolved in a solution containing soda, caustic soda and silicate of soda, mixed with a solution of hydrate of zinc in sodium hydrate, substantially as described.

ADOLF GUTENSOHN.

Witnesses:
H. D. JAMESON,
A. NUTTING.